(12) United States Patent
Keller et al.

(10) Patent No.: US 10,587,635 B2
(45) Date of Patent: Mar. 10, 2020

(54) ON-BOARD NETWORKED ANOMALY DETECTION (ONAD) MODULES

(71) Applicant: THE BOEING COMPANY, Chicago, IL (US)

(72) Inventors: Jason M. Keller, St. Louis, MO (US); James M. Ethington, St. Charles, MO (US); Liessman E. Sturlaugson, St. Louis, MO (US); Mark H. Boyd, Redondo Beach, CA (US)

(73) Assignee: THE BOEING COMPANY, Chicago, IL (US)

( * ) Notice: Subject to any disclaimer, the term of this patent is extended or adjusted under 35 U.S.C. 154(b) by 389 days.

(21) Appl. No.: 15/475,713

(22) Filed: Mar. 31, 2017

(65) Prior Publication Data

US 2018/0288080 A1 Oct. 4, 2018

(51) Int. Cl.
*H04L 29/06* (2006.01)
*G06F 17/11* (2006.01)
(Continued)

(52) U.S. Cl.
CPC .......... *H04L 63/1425* (2013.01); *B64D 45/00* (2013.01); *B64F 5/60* (2017.01); *G06F 17/11* (2013.01); *G07C 5/085* (2013.01); *G07C 5/0808* (2013.01); *H04L 63/1416* (2013.01); *B64D 2045/0085* (2013.01); *H04L 67/12* (2013.01); *H04W 4/38* (2018.02); *H04W 4/42* (2018.02)

(58) Field of Classification Search
CPC . H04L 63/1425; H04L 63/1416; H04L 67/12; B64F 5/60; B64D 45/00; B64D 2045/0085; G06F 17/11; G07C 5/0808; G07C 5/085; H04W 4/38; H04W 4/42
See application file for complete search history.

(56) References Cited

U.S. PATENT DOCUMENTS 9,961,096 B1 * 5/2018 Pierce ................. H04L 63/1425
10,061,632 B2 * 8/2018 Ben Simhon ....... G06F 11/0721
(Continued)

OTHER PUBLICATIONS

Chu et al., Detecting Aircraft Performance Anomalies from Cruise Flight Data, 2010, 2010 AIAA Infotect @ Aerospace Conference, AIAA-2010-3307, pp. 1-17 (Year: 2010).*
(Continued)

*Primary Examiner* — Joseph P Hirl
*Assistant Examiner* — Stephen T Gundry
(74) *Attorney, Agent, or Firm* — Patterson + Sheridan, LLP (57) ABSTRACT

Method and apparatus for detecting anomalous flights. Embodiments collect sensor data from a plurality of sensor devices onboard an aircraft during a flight. A plurality of feature definitions are determined, where a first one of the feature definitions specifies one or more of the plurality of sensor devices and an algorithm for deriving data values from sensor data collected from the one or more sensor devices. Embodiments determine whether anomalous activity occurred during the flight using an anomaly detection model, where the anomaly detection model describes a pattern of normal feature values for at least the feature definition, and comprising comparing feature values calculated from the collected sensor data with the pattern of normal feature values for the first feature definition. A report specifying a measure of the anomalous activity for the flight is generated.

18 Claims, 6 Drawing Sheets

(51) Int. Cl.
*G07C 5/08* (2006.01)
*B64D 45/00* (2006.01)
*B64F 5/60* (2017.01)
*H04L 29/08* (2006.01)
*H04W 4/38* (2018.01)
*H04W 4/42* (2018.01)

(56) References Cited

U.S. PATENT DOCUMENTS

| | | | | |
|---|---|---|---|---|
| 10,104,100 | B1* | 10/2018 | Bogorad | H04L 63/1425 |
| 10,223,403 | B2* | 3/2019 | Malhotra | G06F 17/18 |
| 10,248,742 | B2* | 4/2019 | Desell | G01C 23/00 |
| 10,257,211 | B2* | 4/2019 | Balabine | H04L 63/1416 |
| 2007/0028219 | A1* | 2/2007 | Miller | G05B 23/021 |
| | | | | 717/124 |
| 2009/0216393 | A1* | 8/2009 | Schimert | G05B 23/0251 |
| | | | | 701/14 |
| 2015/0324501 | A1* | 11/2015 | Desell | G01C 23/00 |
| | | | | 703/2 |
| 2016/0147583 | A1* | 5/2016 | Ben Simhon | G06F 11/076 |
| | | | | 714/47.3 |
| 2018/0095004 | A1* | 4/2018 | Ide | G01M 13/00 |
| 2018/0136082 | A1* | 5/2018 | Khibnik | G01M 15/14 |
| 2018/0174671 | A1* | 6/2018 | Cruz Huertas | G16H 50/20 |
| 2018/0224285 | A1* | 8/2018 | Stajner | G09B 29/004 |
| 2018/0225976 | A1* | 8/2018 | Rinehart | G06N 7/005 |
| 2018/0247220 | A1* | 8/2018 | Assem Aly Salama | |
| | | | | G06N 20/00 |
| 2018/0262525 | A1* | 9/2018 | Yan | G06N 20/00 |
| 2018/0285437 | A1* | 10/2018 | Boggio | G06F 16/36 |
| 2018/0348250 | A1* | 12/2018 | Higgins | G01P 5/00 |
| 2018/0365090 | A1* | 12/2018 | Ben Simhon | G06F 11/076 |
| 2018/0365094 | A1* | 12/2018 | Sonalker | G06F 11/0739 |
| 2019/0026963 | A1* | 1/2019 | Watson | G07C 5/0808 |
| 2019/0124099 | A1* | 4/2019 | Matselyukh | H04L 41/142 |

OTHER PUBLICATIONS

Li et al., Anomaly Detection In Onboard-Recorded Flight Data Using Cluster Analysis, 2011, MIT ICAT, slides 1-30 (Year: 2011).*
Chandola, Varun, et al.: "Anomaly Detection: A Survey", ACM Computing Surveys, vol. 41, No. 3, Article 15, Jul. 2009.

* cited by examiner

ON-BOARD NETWORKED ANOMALY DETECTION (ONAD) MODULES

BACKGROUND

Aspects described herein relate to anomaly detection for vehicles, and more specifically, to identifying anomalous activity over the course of a flight.

Anomalous behavior of dynamic systems is known to occur well before a vehicle sub-system reaches an anomalous state. Anomalous behavior can be present when the sub-system is still capable of performing intended functions, however, informing vehicle operators of this anomalous behavior allows for action to be taken, if appropriate. Complex machinery, such as commercial aircraft, occasionally experience equipment anomalies. Some commercial aircraft and other complex machinery can transmit anomaly data to one or more computer systems, such as computer systems used by maintenance centers and computer systems operated by the aircraft manufacturer.

SUMMARY

One embodiment provides a method, non-transitory computer-readable medium and system for detecting anomalous flights of an aircraft. The method, non-transitory computer-readable medium and system include collecting sensor data from a plurality of sensor devices onboard an aircraft during a flight. The method, non-transitory computer-readable medium and system also include retrieving a plurality of feature definitions, where a first one of the plurality of feature definitions specifies one or more of the plurality of sensor devices and an algorithm for deriving data values from sensor data collected from the one or more sensor devices. Additionally, the method, non-transitory computer-readable medium and system include determining whether anomalous activity occurred during the flight using an anomaly detection model, where the anomaly detection model represents, for the first feature definition, a pattern of normal feature values, and where the determining further comprises comparing feature values calculated from the collected sensor data with the pattern of normal feature values for the first feature definition. The method, non-transitory computer-readable medium and system further include generating a report specifying a measure of the anomalous activity for the flight.

In one aspect, in combination with any example above, the anomaly detection model comprises a plurality of online networked anomaly detection (ONAD) modules, and further including training the anomaly detection model, which includes collecting sensor data from the plurality of sensor devices onboard the aircraft during a plurality of previous flights and, for each of the plurality of previous flights, and for each of the plurality of ONAD modules, updating a respective module memory array with a respective learned test reference (LTR) point for the previous flight.

In one aspect, in combination with any example above, each LTR point comprises one or more statistical measures, correlation coefficients or other values of a feature measured against itself or any other feature or a plurality of other features, and training the anomaly detection model further includes determining a convergence bound value, calculating a convergence value for each LTR point across the plurality of previous flights, and, upon determining that a calculated convergence values for a first one of the plurality of previous flights exceeds the convergence bound value, determining that the training is complete.

In one aspect, in combination with any example above, the convergence values are calculated according to the following equation $$CV_i^m = \frac{\left| \frac{\sum_{j=1}^{i} F_j^m}{i} - \frac{\sum_{j=1}^{i-1} F_j^m}{i-1} \right|}{\max(F_1^m, \ldots, F_i^m) - \min(F_1^m, \ldots, F_i^m)},$$

where $F^m$ represents the LTR point for a specified flight and that includes learned features for ONAD module m.

In one aspect, in combination with any example above, a first one of the plurality of feature definitions comprises a temporal representation of a measure of a differential magnitude over a window of time between values from one of the plurality of sensor devices, and wherein determining whether the anomalous activity occurred during the flight using the anomaly detection model, further includes calculating the feature values, based on the collected sensor data and the plurality of feature definitions.

In one aspect, in combination with any example above, comparing the feature values calculated from the collected sensor data with the pattern of normal feature values for each of the plurality of feature definitions is further based on a respective time value during the flight at which the collected sensor data was collected by the respective one or more sensor devices, and wherein the time is expressed as at least one of (i) a measure of time elapsed since a beginning of the flight, (ii) a measure of time during one of a plurality of phases during the flight, (iii) a measure of time remaining in the flight, (iv) a percentage amount of time elapsed since a beginning of the flight and (v) a percentage amount of time remaining in the flight.

In one aspect, in combination with any example above, comparing the feature values calculated from the collected sensor data with the pattern of normal feature values for each of the plurality of feature definitions further includes calculating the feature values based on one or more windows of sensor data collected by the respective one or more sensor devices during the flight.

In one aspect, in combination with any example above, determining whether anomalous activity occurred during the flight further includes calculating an anomaly score for the flight, wherein the anomaly score characterizes the anomalous activity that occurred during the flight with respect to both a duration of the anomalous activity and a magnitude of the anomalous activity.

In one aspect, in combination with any example above, $a_i^m$ represents a number of anomalies detected by module m during the flight i, wherein $T_i^m$ represents a number of samples provided to module m during the flight i, wherein $$p_i^m = \frac{a_i^m}{T_i^m}$$

represents a percentage of the flight that module m considered anomalous.

In one aspect, in combination with any example above, $p_\theta^m$ represents a threshold percentage of anomalous that, if exceeded, indicates that the flight is considered anomalous.

In one aspect, in combination with any example above, a weighting value $w_i^m$ is used to scale an output of the anomaly score based on a convergence value $CV_i^m$, wherein $$w_i^m = \begin{cases} \dfrac{1-CV_i^m}{1-p_\theta^m}, & \text{where } \exists\, j \leq i \text{ such that } CV_j^m > CB^m \\ 1, & \text{otherwise} \end{cases}.$$

In one aspect, in combination with any example above, the calculated anomaly score for the flight comprises a duration anomaly score $D_i^m$, wherein the duration anomaly score is calculated as $$D_i^m = w_i^m \cdot \frac{p_i^m}{p_\theta^m}.$$

In one aspect, in combination with any example above, determining that the flight is an anomalous flight, responsive to determining that the duration anomaly score is greater than or equal to 1.

In one aspect, in combination with any example above, determining whether anomalous activity occurred during the flight using an anomaly detection model further includes calculating a single flight magnitude anomaly score $M_i^m$, wherein the single flight magnitude anomaly score is calculated as $$M_i^m = w_i^m \cdot \left(\frac{1}{\sigma_r}\right) \cdot \left(\frac{1}{a_i^m}\right) \sum_{j=1}^{a_i^m} \frac{(F_j - {}^\circ F_m)}{\sigma_m},$$

where $a_i^m$ represents the number of anomalies for flight i and module m, $F_j$ represents an observed anomalous point, $°F_m$ represents a learned mean for the module m, $\sigma_m$ represents a standard deviation for the module m, and $\sigma_r$ represents an outlier threshold value used to scale the single flight magnitude anomaly score.

In one aspect, in combination with any example above, determining whether anomalous activity occurred during the flight using an anomaly detection model further includes calculating an aggregate anomaly score for the flight as $A_i^m = D_i^m \cdot M_i^m$.

In one aspect, in combination with any example above, the collected sensor data from the plurality of sensor devices onboard the aircraft comprises any combination of measurements including pressure, temperature, flight parameters, aircraft parameters, and environmental measurements during different phases of the flight, and wherein the detected anomaly comprises at least one of (i) a point anomaly where a first data instance of a plurality of data instances is anomalous relative to other data instances in the plurality of data instances, (ii) a contextual anomaly where a second one of the plurality of data instances is anomalous relative to a specific context, and (iii) a collective anomaly where two or more data instances within the plurality of data instances are anomalous relative to a remainder of the plurality of data instances.

In one aspect, in combination with any example above, two or more of the plurality of data instances are anomalous relative to a remainder of the plurality of data instances, even though each of the two or more data instances is not anomalous in and of itself.

In one aspect, in combination with any example above, the method, non-transitory compute-readable medium and system further include receiving, over a data communications network, additional sensor data collected from a second plurality of sensor devices onboard at least one additional aircraft during a plurality of previous flights, and training the anomaly detection model, wherein the anomaly detection model comprises a plurality of online networked anomaly detection (ONAD) modules, and comprising, for each of the plurality of previous flights, updating a respective module memory array with a respective learned test reference (LTR) point for the previous flight.

BRIEF DESCRIPTION OF ILLUSTRATIONS

DETAILED DESCRIPTION

Routine diagnostic testing and monitoring can be used to help prevent anomalous behavior, which can be indicative of part and system failure on an aircraft. However, detecting anomalies, as a general matter, is not easy to solve. One challenge is the notion of what may constitute an anomaly can be different from one application domain to another. Another challenge when designing an anomaly detection system that operates in real-time within an aircraft system is the complexity of the aircraft system. Because of complex interactions between components in an aircraft system, the analysis of raw signal data does not necessarily provide enough context to perform anomaly detection. Additionally, although aircraft are typically configured with a substantial number of sensors, a sensor may not be available for each part or system and each metric that can be useful to evaluated for each part and system, and adding additional sensors can be prohibitively expensive, difficult (e.g., in terms of getting additional sensors approved) and slow (e.g., the amount of time needed to get additional sensors approved). Moreover, certain metrics for an aircraft may not be measurable by a sensor device. As such, performance data can be derived from a combination of multiple signals, as sensors may not exist for every component of interest. In short, information needed to drive anomaly detection may not exist in the set of sensors and signals recorded on a given platform.

An additional challenge for detecting anomalies on an aircraft is that typically unsupervised or semi-supervised learning techniques are ideal for detecting such anomalies, but within an aircraft system environment, it can be difficult if not impossible to obtain training data which covers the entire set of anomalous behavior that could be encountered during a flight. A typical approach in a semi-supervised technique is to build a model for the class corresponding to normal behavior and test against it. The challenge encountered with respect to a lack of training data related to anomalous behavior is in determining both the boundary between nominal and anomalous behavior and the amount of acceptable error statistical therein.

It can also be challenging to select and implement a learning algorithm that provides information that leads to actionable activities and that is not prone to error or misclassification. Generally, misclassifications (e.g., false positives in anomaly detection) can result in needless maintenance activity being scheduled or can result in expensive investigation being performed by requisite subject matter experts to determine that the detected anomaly was a misclassification. As such, minimizing the number of misclassifications is advantageous. Additionally, many anomaly detection systems need to run in a real-time streaming context on-board an aircraft, processing data at rates up to and possibly beyond 20 Hz. These performance requirements rule out some machine learning algorithms that while robust, are unable to execute within these constraints.

Accordingly, embodiments provide techniques for detecting anomalous activity during a flight. One embodiment collects sensor data from a plurality of sensor devices onboard an aircraft during a flight. Additionally, a plurality of feature definitions can be retrieved. Each feature definition can specify a respective one or more of the plurality of sensor devices and a respective algorithm for deriving data values from sensor data collected from the one or more sensor devices. Embodiments can determine whether anomalous activity occurred during the flight using an anomaly detection model. The anomaly detection model can represent, for each of the plurality of feature definitions, a pattern of normal feature values for the feature definition. In one embodiment, the anomalous activity is determined by comparing feature values calculated from the collected sensor data with the pattern of normal feature values for each of the plurality of feature definitions. A report specifying a measure of the anomalous activity for the flight can then be generated.

Software that is hosted on-board an aircraft (or other critical embedded system) is held to a higher level of rigor than in other domains. The process for validating that a software component does not adversely impact the aircraft system up to and including certification of new software components and re-certification of updated software components is a costly and lengthy activity. A useful data analytics environment may use multiple cycles of testing, training and redeployment in order to achieve the intended results. Within the lengthy process of software certification, this process cannot be implemented in a productive manner. Embodiments described herein provide techniques for separating the ONAD software executable from the data (learned models, feature definitions and statistical measures) such that the data elements can be updated apart from the software executable.

Figure 1:
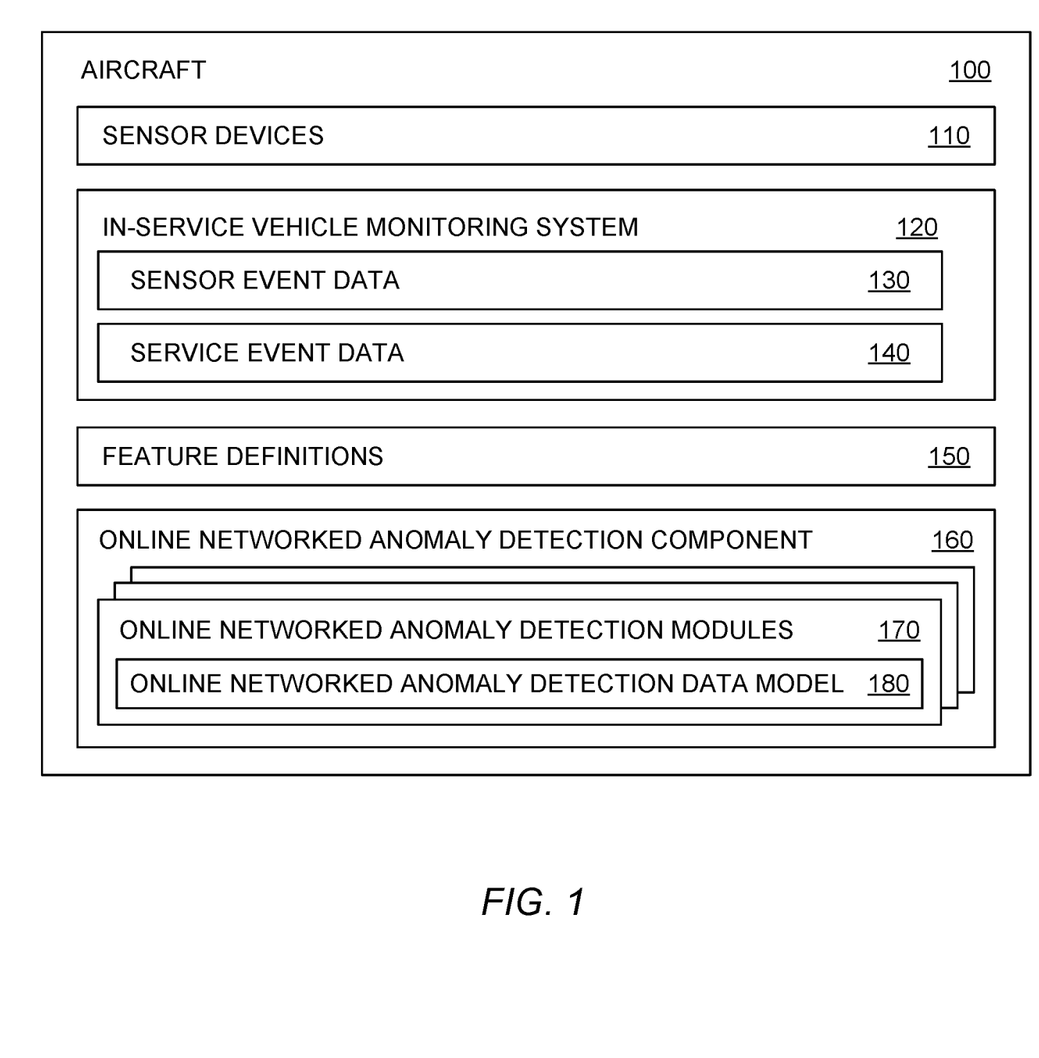
FIG. 1 illustrates an aircraft configured with an in-service vehicle monitoring system, according to one embodiment described herein.

FIG. 1 illustrates an aircraft configured with an in-service vehicle monitoring system, according to one embodiment described herein. The aircraft 100 includes sensor devices 110, an in-service vehicle monitoring system 120, feature definitions 150 and an Online Networked Anomaly Detection (ONAD) component 160. The in-service vehicle monitoring system 120 includes sensor event data 130 and service event data 140. Generally, the service event data 140 represents diagnostic data (e.g., diagnostics codes and corresponding timestamps at which events classified with the diagnostic codes were detected) collected for the corresponding in-service vehicle. In one embodiment, events within the service event data 140 are automatically recorded by control logic within vehicles of the given class of vehicle.

The sensor event data 130 generally represents data collected from the sensor devices on the respective in-service vehicle. Sensor devices 110 may include, without limitation, temperature sensors, pressure sensors, positioning sensors, altitude sensors, and so on. More generally, any sensor suitable for monitoring an attribute of an in-service vehicle can be used, consistent with the functionality described herein. In one embodiment, the in-service vehicle monitoring system 120 provides a plurality of predefined trigger conditions, each specifying conditional logic for one or more types of sensor data collected from the one or more sensor devices. In such an embodiment, upon determining that one or more sensor data values from the one or more sensor devices satisfy one of plurality of predefined trigger conditions, the in-service vehicle monitoring system 120 records a service event within the service event data 140.

The ONAD component 160 contains a plurality of ONAD modules 170, each configured with an ONAD data model 180. Generally, the ONAD component 160 can perform an operation for detecting anomalous activity during a flight. For example, an ONAD module 170 can retrieve a plurality of feature definitions. Each feature definition can specify a respective one or more of the plurality of sensor devices and a respective algorithm for deriving data values from sensor data collected from the one or more sensor devices. For example, a particular feature could be calculated by taking the difference between two temporally adjacent values for a particular sensor device.

Generally, each of the ONAD data model 180 represents a learned pattern of normal feature values for a particular one of the feature definitions. The ONAD module 170 can compare the calculated feature values with the pattern of normal feature values for the corresponding feature definition to determine whether anomalous activity occurred during the flight using an anomaly detection model. In doing so, the ONAD module 170 can consider the time during the flight at which the sensor values were collected, in comparing the feature value with the pattern of normal feature values. As an example, a particular feature value may not be considered anomalous during the take-off of a flight, but could be considered anomalous during the landing phase of the flight.

The ONAD module 170 can generate a report specifying a measure of the anomalous activity for the flight. In one embodiment, the ONAD module 170 generates the report by setting a particular flag to a predefined value, indicating an occurrence of anomalous activity during the flight. In a particular embodiment, the report comprises an alert describing the anomalous activity for the flight. Such an alert could be, for example, displayed on an interface for an in-vehicle health management system about the aircraft. In one embodiment, the ONAD module 170 generates a textual report that specifies the measure of anomalous activity and specifies one or more feature definitions for which the anomalous activity was detected. Such a report could then be transmitted (e.g., over a data communications network) to one or more remote computing systems for further analysis. For instance, the report could be sent to an aircraft maintenance system, for use in predicting anomalies that will occur with various parts and subsystems onboard the aircraft. As an example, the aircraft maintenance system and aircraft maintenance personnel could monitor anomalous behavior across a plurality of flights of the aircraft and can determine when the pattern of anomalous behavior indicates that particular aircraft maintenance should be performed. As another example, the report could be transmitted to a vehicle design system, for use in identifying anomalies with the design of the aircraft. For instance, the vehicle design system could collect reports from a plurality of aircrafts of a given aircraft type and the vehicle design system and vehicle design personnel can determine patterns of anomalous behavior occurring across the plurality of aircrafts. The patterns of anomalous behavior could then be mapped to one or more attributes of the design of the aircraft, and the vehicle design personnel could consider the anomalous behavior and the one or more design attributes when updating the aircraft design and when creating subsequent aircraft designs.

Generally, anomalies can be classified into three types: point anomalies, contextual anomalies and collective anomalies. Point anomalies refer to individual data instances that can be considered as anomalous with respect to the rest of the data. As an example, a temperature reading above a certain threshold temperature from a specific sensor can be considered anomalous, regardless of the time during the flight at which the sensor reading occurred. Contextual anomalies refer to data instances that are anomalous within a specific context, but not under a different context. For example, another temperature sensor reading could be considered anomalous if it exceeds a threshold temperature when the plane is idling, but not anomalous during the take-off phase of the flight. A collective anomaly refers to a collection of related data instances being anomalous with respect to the entire set of data instances. In a collective anomaly, the individual data instances may not themselves be considered anomalous (e.g., the individual data instances may not be considered point anomalies).

Additionally, the ONAD component 160 can determine an overall measure of anomalous activity for the flight. From a general perspective, a single instance of an anomaly may not be particularly actionable from an aircraft system perspective. As such, the ONAD component 160 can be configured to detect persistent anomalous behavior across the ONAD modules 170, over a specified period of time and within a certain context provides a better indicator that some (potentially costly) action should be taken.

The feature definitions 150 represent a learned relationship between parametric signals. In one embodiment, the feature definitions 150 are informed by system design intent and ideally provide a high likelihood of identifying system anomalies. Generally, such feature definitions are generated based on expected system behavior during nominal conditions (e.g., a pressure/temperature relationship during a certain phase of flight) that may change in the event of anomalous system operation. In one embodiment, an optimal sized list of features is determined, that is capable of describing system operation but that is also not overly complex. For example, feature definitions can be determined that facilitates the identification of anomalous behavior in advance of anomaly states and the identification of thresholds between nominal and anomalous behavior.

In one embodiment, the ONAD component 160 is configured with a set of ONAD modules 170 that are instituted at many different levels within the aircraft. For example, in an operational context, the ONAD modules 170 can be applied to sub-systems, sub-system relational profiles, and entire vehicle profiles. As such, the ONAD component 160 can provide a physics informed, feature-based anomaly detection system that uses statistical measures to provide real-time anomaly detection aboard an aircraft during flight operations. Additionally, the ONAD component 160 can provide an unsupervised or semi-supervised learning algorithm to detect point anomalies, imbuing context through the use of features and filters and provides actionable data detecting persistent anomalous behavior, quantifying such behavior through the use of interpretable anomaly scores.

Figure 2:
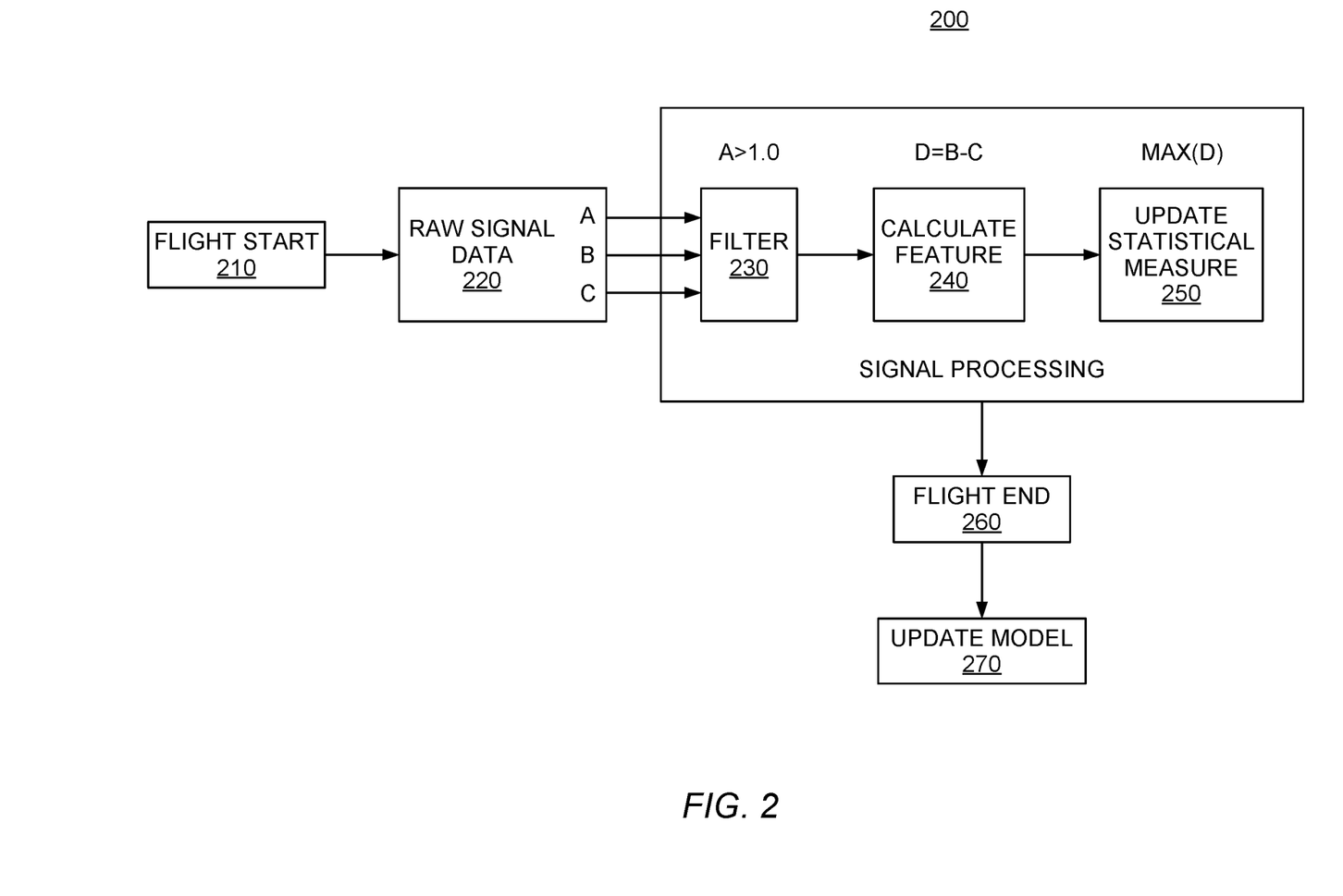
FIG. 2 illustrate a workflow for training an ONAD data model, according to one embodiment described herein.

The creation of the ONAD modules 170 can include an online training phase that can be iterated to generate the ONAD data models 180. This training phase allows an algorithmic module to be learned online (i.e., upon integrated operation). FIG. 2 illustrate a workflow for training an ONAD data model 180, according to one embodiment described herein. As shown, the workflow 200 begins at operation 210, where a flight of an aircraft begins. Raw signal data is collected from a plurality of sensor devices within the aircraft at operation 220. Generally, any number and type of sensor devices within the aircraft can be used, consistent with the functionality described herein.

In the depicted embodiment, a filtering operation 230 is performed, in which a set of predefined rules are used to selectively filter certain values from the raw signal data collected from the sensor devices. For example, one such rule could specify that sensor values collected from a particular sensor that are greater than 1.0 should be filtered (i.e., removed) from the set of sensor data used to train the ONAD model 180. More generally, however, any sort of filtering rule and requirement can be used, consistent with the functionality described herein. In a particular embodiment, no filtering operation is performed and at least one of the ONAD models 180 is trained using raw signal data.

Once the filtering operation 230 is performed, feature values are calculated using one or more feature definitions (operation 240). The statistical measure for the feature within the ONAD model 180 is updated (operation 250). For example, one feature value could be calculated as the difference between two temporally adjacent sensor readings for a sensor device. For instance, if a temperature sensor reads the value of 130.9 degrees Fahrenheit and, at the next data collection interval, reads a value of 133.4 degrees Fahrenheit, the feature value could be calculated as 2.5 degrees Fahrenheit (i.e., the difference between the two temperature values). As another example, a feature could be defined as the difference between the maximum sensor reading and the minimum sensor reading within a defined interval of time. As yet another example, a feature could be defined as the maximum sensor reading within a defined interval of time, while yet another feature could be defined as the average sensor value over a defined interval of time. More generally, any algorithm for deriving a feature value can be specified in a feature definition, consistent with the functionality described herein.

In one embodiment, the training phase for the ONAD models 180 takes place in an initial operational environment such as flight test. In such an embodiment, during flight operations, the mission or vehicle computing mechanisms have access to all data streams. As programmed, the data streams that are used for creation of module m's features $F_m$ are processed appropriately resulting in a quantifiable value. This quantifiable measure, known as a learned test reference (LTR) point can be any statistical measure, correlation coefficient, or other value of the feature measured against itself or any other feature or a plurality of other features. These features can also include temporal representations of any number of relationships such as measurement of a differential magnitude over a time window between two signals. Once flight i ends, the ONAD module m updates the ONAD model (e.g., a module memory array) with the LTR point for that flight, resulting in an array of LTRs given multiple modules. This process can be repeated over a series of n flights, where n is a configurable parameter that is set to a value large enough to capture a range of signal values representative of normal operating conditions, a number that can be determined by the system engineer.

Generally, when training the ONAD models 180 to learn the normal feature values for a normal flight of an aircraft, the ONAD modules 170 can consider timing information during the flight at which the various feature values occur. As discussed above, for example, a particular feature value may be anomalous if occurring when the plane is idling before take-off (e.g., a first phase of the flight), but may not be anomalous during the take-off itself (e.g., a second phase of the flight). Generally, such timing information can be expressed in any number of different ways. For example, the flight could be divided into a set of predefined phases, and feature values can be construed in light of the phase during which the feature values are determined. As another example, the normal pattern of feature values for a given ONAD model 180 can be modelled relative to a time value during the flight at which the sensor data was collected by the sensor devices within the aircraft. Such a time value can be expressed as, for example and without limitation, (i) a measure of time elapsed since a beginning of the flight, (ii) a measure of time during one of a plurality of phases during the flight, (iii) a measure of time remaining in the flight, (iv) a percentage amount of time elapsed since a beginning of the flight and/or (v) a percentage amount of time remaining in the flight.

During this training phase, an engineer responsible for implementation can ensure that no known anomaly cases occur. If anomaly cases occur, the corresponding LTR points should be removed from the training data set. That is, it is generally preferable that the ONAD modules build the ONAD data models 180 using normal operating data, rather than anomalous operating data. The LTR points, regardless of their measurement unit, can be used to bound this training period of n flights. In doing so, the engineer, with the prior knowledge that the vehicle has been operated in many envelopes, can declare that a nominal baseline has been established, after which the ONAD module is ready for deployment.

To implement a dynamic training period based upon the LTR points, the ONAD modules 170 can perform the calculation shown in Equation 1 after each flight i during the training period with the array of LTR points.

Equation 1-Convergence Values $$CV_i^m = \frac{\left|\frac{\sum_{j=1}^{i} F_j^m}{i} - \frac{\sum_{j=1}^{i-1} F_j^m}{i-1}\right|}{\max(F_1^m, \ldots, F_i^m) - \min(F_1^m, \ldots, F_i^m)}$$

Here, $F_i^m$ represents the LTR point for a specified flight i and that includes learned features for ONAD module m. That is, the convergence value for each LTR point can be calculated as the absolute difference between the feature's value averaged over all flights and the feature's value averaged over all but the latest flight, normalized by the range of all of the feature's values. By normalizing by each feature's range, the ONAD modules 170 can compare of convergence across different modules or features, regardless of the units. Generally, the goal is for the convergence value $CV_i^m$ to decrease as the estimate of feature $F^m$ stabilizes when i increases.

For example, let the convergence bound $CB^m$ for module m be a value determined prior to the training phase. When the ONAD module 170 determines that the convergence value $CV_i^m$ is less than or equal to the convergence bound $CB^m$, the ONAD module 170 can determine that the training phase is complete. As an example, assume that the ONAD module 170 is configured to measure the mean value of a feature. At the end of each flight during the training phase, the ONAD module 170 can calculate how much the mean value of this LTR changed when compared with the set of previous flights. Over time, the change in mean values will typically tend to decrease enough to drop below a certain percentage of the range. This may be referred to herein as the LTR Termination Point, and the corresponding LTR at this point may be referred to as the LTR Threshold Point.

Figure 3:
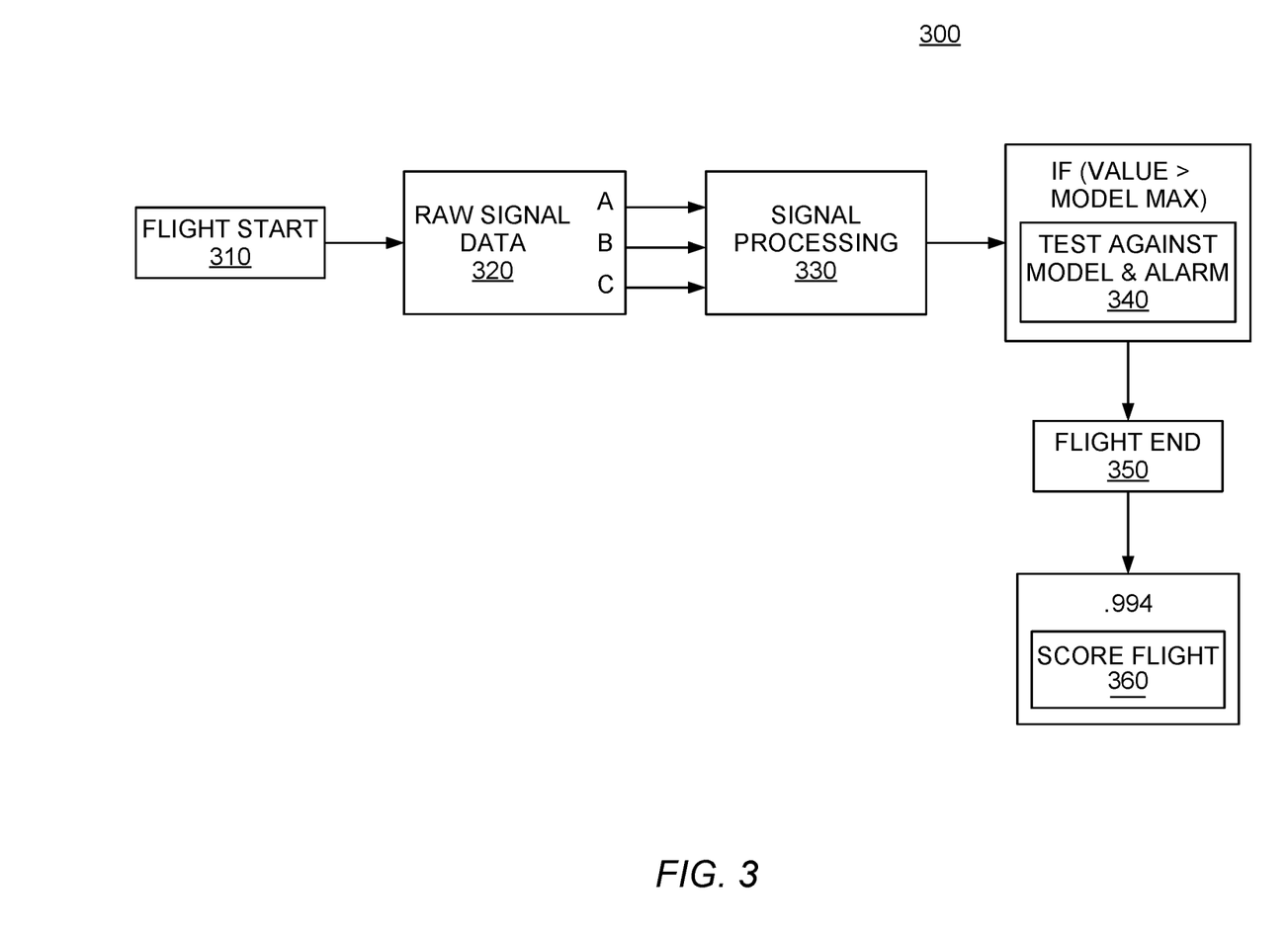
FIG. 3 is a workflow depicting a technique for scoring a flight based on anomalous activity occurring during the flight, according to one embodiment described herein.

Once an ONAD module 170 is sufficiently trained it can be deployed for networked anomaly detection. An example of such a trained ONAD module is shown in FIG. 3, which is a workflow depicting a technique for scoring a flight based on anomalous activity occurring during the flight, according to one embodiment described herein. In a deployed environment, just as in a training environment, the ONAD module 170 can be provided the same raw data streams available to the mission or vehicle computing environment for signal processing. The workflow 300 starts at operation 310, where the flight begins. Raw signal data is collected from a plurality of sensor devices within the aircraft at operation 320. The ONAD module 170 then performs a signal processing operation at operation 330, which can include, e.g., filtering of raw sensor data using predefined filtering rules and calculating feature values from the unfiltered sensor data using feature definitions.

At operation 340, the ONAD module 170 tests the feature values against the ONAD data models 180 to detect when the calculated feature values are sufficiently anomalous to merit an alarm. For example, if the ONAD module 170 determines that a feature value exceeds a maximum feature value specified within the corresponding ONAD model 180, the ONAD module 170 could generate an alarm specifying the anomalous feature value. More generally, any type of rule for generating alarms from calculated feature values can be used, consistent with the functionality described herein.

Once the flight ends (block 350), the ONAD module 170 can calculate an anomaly score for the flight (block 360). That is, the generation of a single alarm (or a relatively small number of alarms) during a flight may not necessarily indicate that a system within the aircraft exhibited anomalous behavior during the flight. For instance, a particular feature value could result from an erroneous sensor reading, but a single such feature value may not be indicative of anomalous behavior during the flight.

As such, in one embodiment, the ONAD module 170 is configured to calculate the anomaly score for the flight that characterizes the anomalous behavior during the flight with respect to both the duration and the magnitude of the anomalous activity. For example, let $a_i^m$ represents a number of anomalies detected by module m during the flight i. In cases where the algorithm for an ONAD module 170 tracks multiple features, each with multiple LTR outlier boundaries, the ONAD module can perform an OR operation over each raised alarm per signal sample. In other words, in such an embodiment, the alarm count for a single ONAD module 170 will not exceed a value of 1.0, at each discrete point within the time series feature data.

Additionally, let $T_i^m$ represent a number of samples provided to module m during the flight i. Therefore, the value $$p_i^m = \frac{a_i^m}{T_i^m}$$

represents a percentage of the flight that module m is considered anomalous. According to one embodiment, the value $p_\theta^m$ represents a threshold percentage of anomalous that, if exceeded, indicates that the flight is considered anomalous. In one embodiment, the value $p_\theta^m$ is 1% (0.01). In another embodiment, the value $p_\theta^m$ is based on normal expectations derived from the standard distribution boundaries.

A weighting value $w_i^m$ may be used to scale an output of the anomaly score based on a convergence value $CV_i^m$, as the ONAD module 170 transitions from training to testing. In one embodiment, the weighting value $w_i^m$ is defined according to Equation 2.

Equation 2-Weighting Value $$w_i^m = \begin{cases} \frac{1-CV_i^m}{1-p_\theta^m}, & \text{where } \exists\, j \le i \text{ such that } CV_j^m > CB^m \\ 1, & \text{otherwise} \end{cases}$$

As discussed above, the ONAD modules 170 can consider the duration of the anomalous activity in gauging the anomaly score for the flight. In one embodiment, a duration anomaly score $D_i^m$ is calculated as defined in Equation 3.

$$D_i^m = w_i^m \cdot \frac{p_i^m}{p_\theta^m} \qquad \text{Equation 3-Duration Anomaly Score}$$

Generally, the ONAD modules 170 can categorize flights as anomalous when a score $AD_i^m$ is greater than or equal a threshold level (e.g., a value of 1.0). In one embodiment, the resultant durational anomaly score is readily interpretable as it represents the percentage of the flight that the anomalous behavior occurred (e.g., an anomaly score of 25.3 with a $p_\theta^m$ value of 0.01 means the anomalous behavior occurred during approximately 25% of the flight).

In addition to the duration of the anomalous activity, the amount which the feature values for the current flight deviated from the nominal observed samples for previous flights. The ONAD module 170 can calculate a magnitude anomaly score $M_i^m$ for flight i, module m, by computing the average standard deviation from the mean over the set of anomalous data points. For example, let $a_i^m$ represent the number of anomalies for flight i and module m, let $F_j$ represent an observed anomalous point, let $\overline{F^m}$ represent a learned mean for the module m, let $\sigma_m$ represent a standard deviation for the module m, and let $\sigma_r$ represent an outlier threshold value used to scale the single flight magnitude anomaly score. As an example, a value of 3.0 for $\sigma_r$ could represent a sigma value of +3.0, and the magnitude score could be scaled according to this value, as shown in Equation 4.

Equation 4-Single Flight Magnitude Anomaly Score $$M_i^m = w_i^m \cdot \left(\frac{1}{\sigma_r}\right) \cdot \left(\frac{1}{a_i^m}\right) \sum_{j=1}^{a_i^m} \frac{(F_j - \overline{F_m})}{\sigma_m}$$

In one embodiment, the ONAD modules 170 are configured to combine the duration and anomaly magnitude scores into a single, aggregate anomaly score for the flight, as shown in Equation 5.

$$A_i^m = D_i^m \cdot M_i^m$$

Equation 5—Single Flight Aggregate Anomaly Score

Thus, after completion of the flight the resultant LTRs are compared to the learned nominal LTR threshold during the training phase to determine if any operational systems during that flight may have exhibited anomalous behavior. To determine an outlier in comparison to the LTR threshold, during configuration of the module, the ONAD modules 170 may set statistical parameters (e.g., x standard deviations from a mean) as outlier thresholds with reference to the LTR threshold. ONAD modules 170 may then output LTR points beyond these thresholds are known as anomalous data points. Advantageously, by considering both the durational and magnitude anomaly scores, the ONAD modules 170 can detect both persistent anomalous behavior and brief, but impactful anomalies as well.

Figure 4:
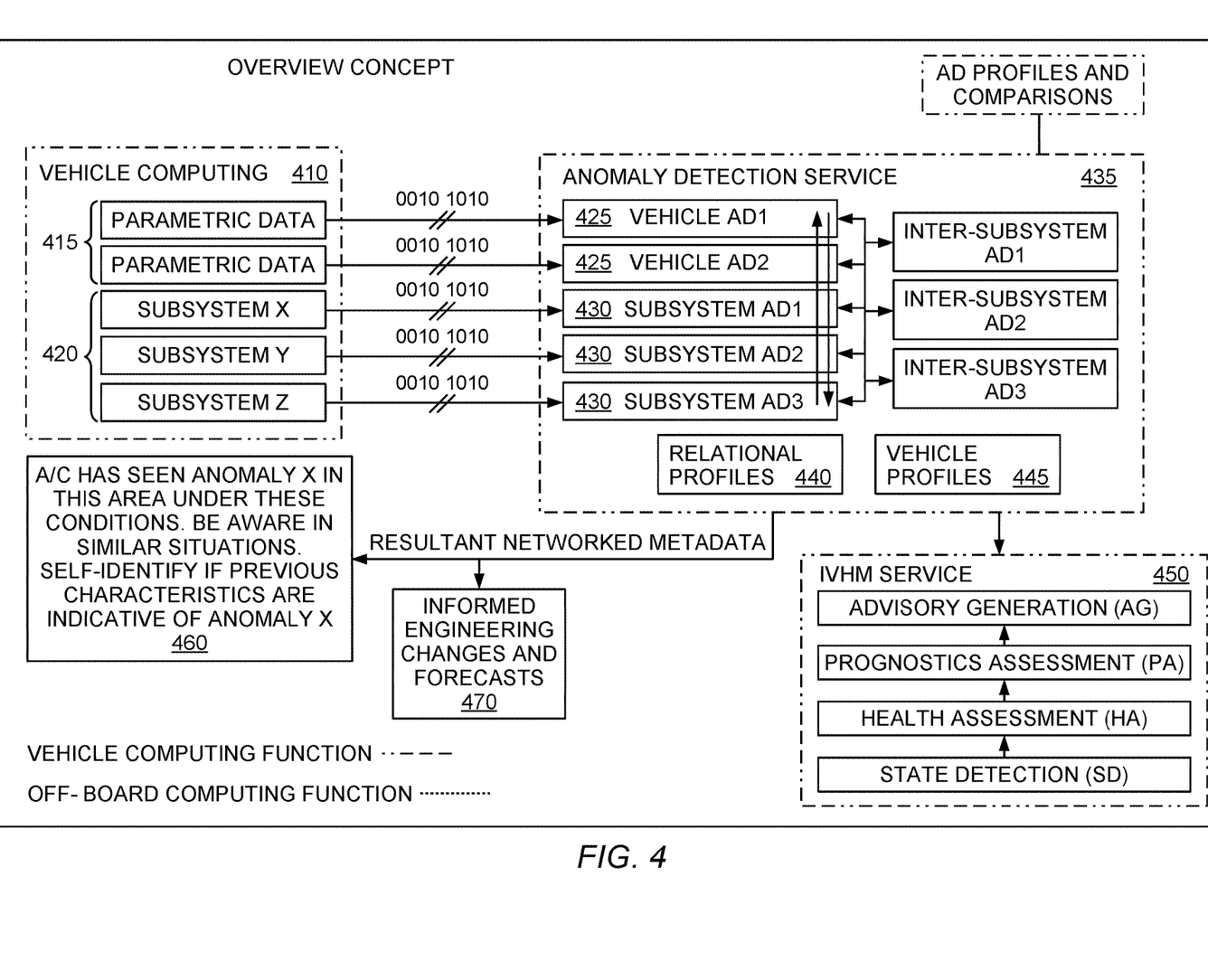
FIG. 4 is a system for detecting anomalies within an aircraft, according to one embodiment described herein.

FIG. 4 is a system for detecting anomalies within an aircraft, according to one embodiment described herein. As shown, the system 400 includes a vehicle computing system 410 which, using a plurality of sensor devices, collects signal data during the flight of the aircraft. In the depicted embodiment, the vehicle computing system 410 collects both parametric data 415 and subsystem data 420 during the flight. These signal values are then processed by an anomaly detection service 435, which includes vehicle ONAD modules 425 and subsystem ONAD modules 430. Likewise, the output of the vehicle ONAD modules 425 and subsystem ONAD modules 430 are processed by inter-subsystem ONAD modules, which can consider both relational profiles 440 and vehicle profiles 445. Generally, the relationship profiles 440 can specify the relationships between various sensor devices and subsystems within the aircraft. The vehicle profiles 445 may specify the sensors and subsystems within a particular type of vehicle, and may further specify correlations between sensors and subsystems across different classes of vehicles.

The output of the ONAD modules 425 and 430, as well as the inter-subsystem ONAD modules, can be used in a variety of ways. In the depicted embodiment, the output of the ONAD modules is used as inputs to onboard hardware monitoring applications, e.g., the in-vehicle health management (IVHM) service 450. For example, the IVHM service 450 could perform a state detection (SD) operation, where the IVHM service 450 determines that a particular flight was considered anomalous as a result of the output of the anomaly detection service 435. The IVHM service 450 could perform a health assessment (HA) operation to assess the overall health of the vehicle. In doing so, the IVHM service 450 could analyze collected parametric data 415 and subsystem data 420 and could perform various diagnostics adapted to assess the health of the vehicle. The IVHM service 450 could then perform a prognostics assessment (PA) operation, where the IVHM service 450 predicts when anomalous behavior may occur with vehicular equipment (e.g., a specific part, a particular subsystem, etc.).

The IVHM service 450 can then perform an advisory generation (AG) operation, where the IVHM service 450 generates an alert specifying the predicted anomaly and timing information. For example, the IVHM service 450 could transmit the alert to a member of the flight crew, notifying the member of the detected anomaly during the flight and providing a summary of the HA operation and the PA operation. As another example, the IVHM service 450 could transmit an alert to a maintenance technician, notifying the technician of the detected anomaly during the flight and providing a summary of the HA operation and the PA operation, and the maintenance technician could then perform one or more corresponding maintenance operations on the aircraft as a result of the alert. For example, the maintenance technician could determine, based on the alert, that a particular part or subsystem within the aircraft is likely to exhibit anomalous behavior in the future, and could perform a maintenance operation on the aircraft to service or replace the part or subsystem.

Additionally, the anomaly scores and other data produced by the ONAD modules can be provided to design engineers for the aircraft, which can enable the design engineers to make more informed engineering changes and forecasts, as shown in operation 470. For example, design engineers could correlate the reported anomaly scores and other data with part anomalies and subsequent maintenance operations performed on the vehicle, to determine, e.g., particular vehicle parts and/or subsystems that can cause operational anomalies, design attributes that can lead to operational anomalies, and so on. The design engineers could then incorporate their findings from correlating the reported anomaly scores into the next iteration of the aircraft design, so as to prevent the anomalous behavior from occurring or reduce the likelihood of the anomalous behavior occurring in the newly designed aircraft.

Moreover, the output of the ONAD modules can be used for further training the ONAD data models 180 for the specific aircraft or for other aircrafts, as shown in operation 460. For example, the ONAD modules could transmit the results of the ONAD modules 170 and other data describing the flight to ONAD modules for other flights. The ONAD modules for the other aircraft (or for a centralized computing system) could then determine that while particular behavior appeared anomalous for flights more generally, for flights having specific characteristics (e.g., travelling a specific flight path, travelling during specific weather conditions or more generally having attributes in common), the behavior may not be anomalous. Thus, the ONAD modules across various flights may communicate with one another (e.g., directly or indirectly, by operation of a data communications network) to share output results as well as flight information and metadata, for use in further refining the ONAD data models 180.

Table 1 depicts the output of several ONAD modules 170 during a particular flight.

TABLE 1

ONAD Module Output

| ONAD ID | Score | LTR | Feature | Assoc. Params | Other Data |
|---|---|---|---|---|---|
| 21AAA | 0.256 | 26 psi | $P_1 - P_2$ | $P_1, P_2$ | Notes . . . |
| 21AAB | 0.001 | 5 deg./s | $T_2/t$ | $T_2, t$ | . . . |
| 24AAA | 52.340 | 28 VDC | $V_2 * 10$ | $V_2$ | . . . |
| 24AAB | 0.0151 | 402 Hz | max(f) | f | . . . |

As shown, the resultant output of all instituted ONAD modules includes the anomaly scores for each module and the corresponding metadata. For example, the ONAD module 170 for the feature defined as "$P_1-P_2$," where $P_1$ and $P_2$ represent calculated feature values at times 1 and 2, calculated an anomaly score of 0.256 for the flight in question. The anomaly score could then be compared with a threshold anomaly score (e.g., a value 1.0) to determine whether the ONAD module considered the flight to be invalid. Thus, the ONAD module having the ID 21AAA in the present example determined that the flight in question did not exhibit anomalous behavior for the tracked feature. On the other hand, the ONAD module for the ONAD ID 24AAA produced an anomaly score of 52.34, indicating a severe anomaly has likely occurred for the corresponding feature. Upon determining the flight is considered anomalous, the ONAD module with ID 24AAA could generate an alert. In doing so, the ONAD module could also identify the feature(s) used in the calculation of that score which would provide traceability for engineers to identify an area of a system which may have an impending anomaly condition and take appropriate action, which includes but is not limited to pre-positioning of assets and operational schedule changes.

During flight test and design maturation phases, the training phase of ONAD module development provides the threshold by which built-in test (BIT) design thresholds can be built. Embodiments described herein enable the realistic and possibly dynamic test thresholds to be evaluated, tested, and instituted at the appropriate point in the design phase, leading to significantly improved vehicle reliability and maintainability performance and reduced design time. Similarly this and other information can be made available via a fleet networking mechanism. In the event an anomaly is detected on an aircraft the corresponding information and metadata is made available to the networked fleet of smart aircraft. These aircraft are equipped with the ability to interpret and incorporate this information into their ONAD standard architecture within the open computing architecture environment. Information such as aircraft parameters and geographical location at the time of the anomaly can inform the rest of the fleet regarding the status of the anomalous asset, leading to a more self-aware fleet from the aspect of health management (HM) and sustainment.

Figure 5:
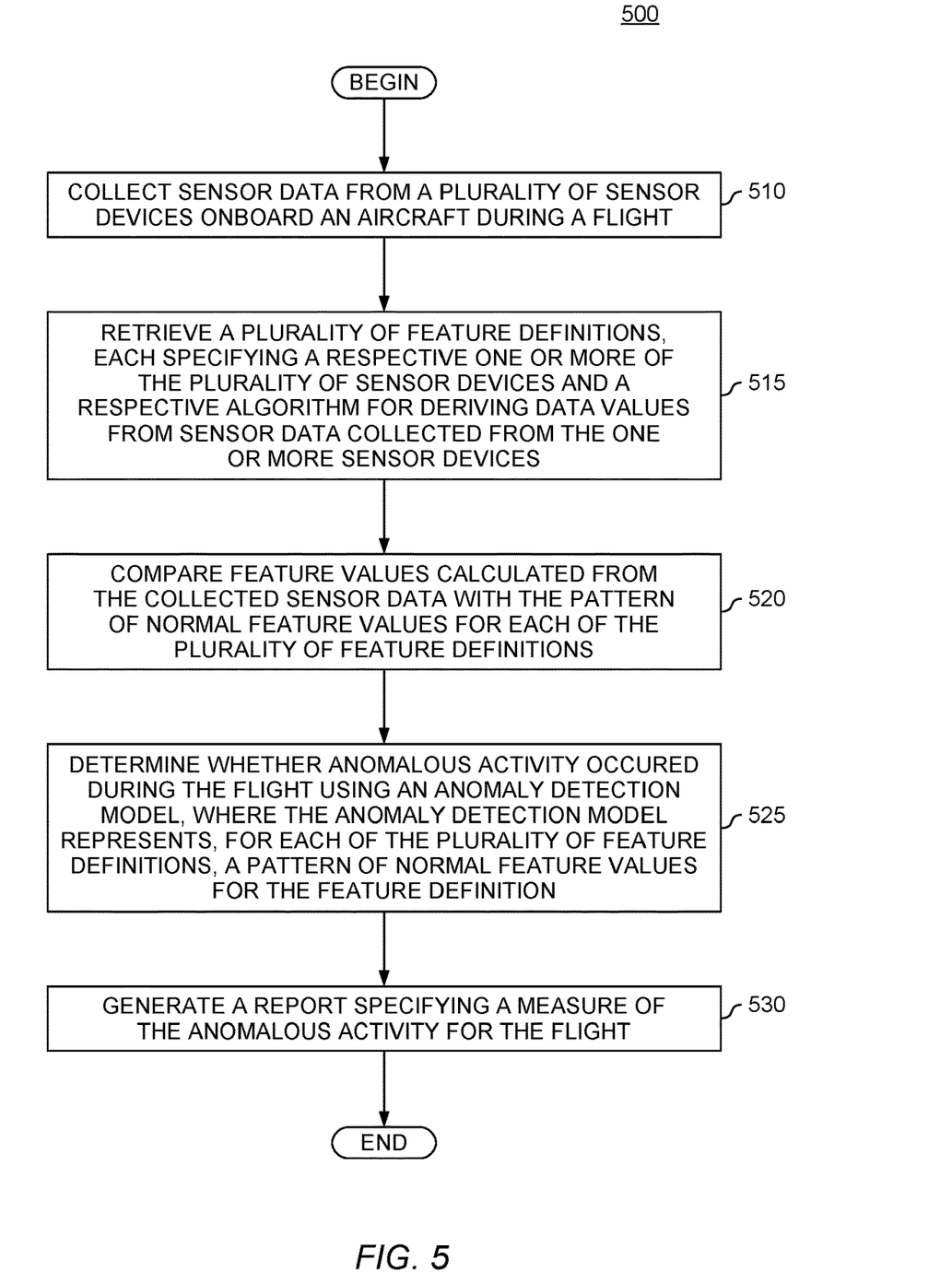
FIG. 5 is a flow diagram illustrating a method of detecting anomalies within a flight of an aircraft, according to one embodiment described herein.

FIG. 5 is a flow diagram illustrating a method of detecting anomalies within a flight of an aircraft, according to one embodiment described herein. As shown, the method 500 begins at block 510, where a plurality of sensor devices within an aircraft collect sensor data during a flight. An ONAD component 160 retrieves a plurality of feature definitions, each specifying a respective one or more of the plurality of sensor devices and a respective algorithm for deriving data values collected from the specified sensor devices (block 515).

The ONAD component 160 then compares feature values calculated from the collected sensor data with the pattern of normal feature values for each of the plurality of feature definitions (block 520). The ONAD component 160 determines whether anomalous activity occurred during the flight using an anomaly detection model, where the anomaly detection model represents, for each of the plurality of feature definitions, a pattern of normal feature values for the feature definition (block 525). Thus, for example, the ONAD component 160 may be configured with a plurality of ONAD modules 170, each configured to train and use a respective ONAD data model 180 that corresponds to a respective feature definition. The ONAD component 160 generates a report specifying a measure of anomalous activity for the flight (block 530), and the method 500 ends.

Figure 6:
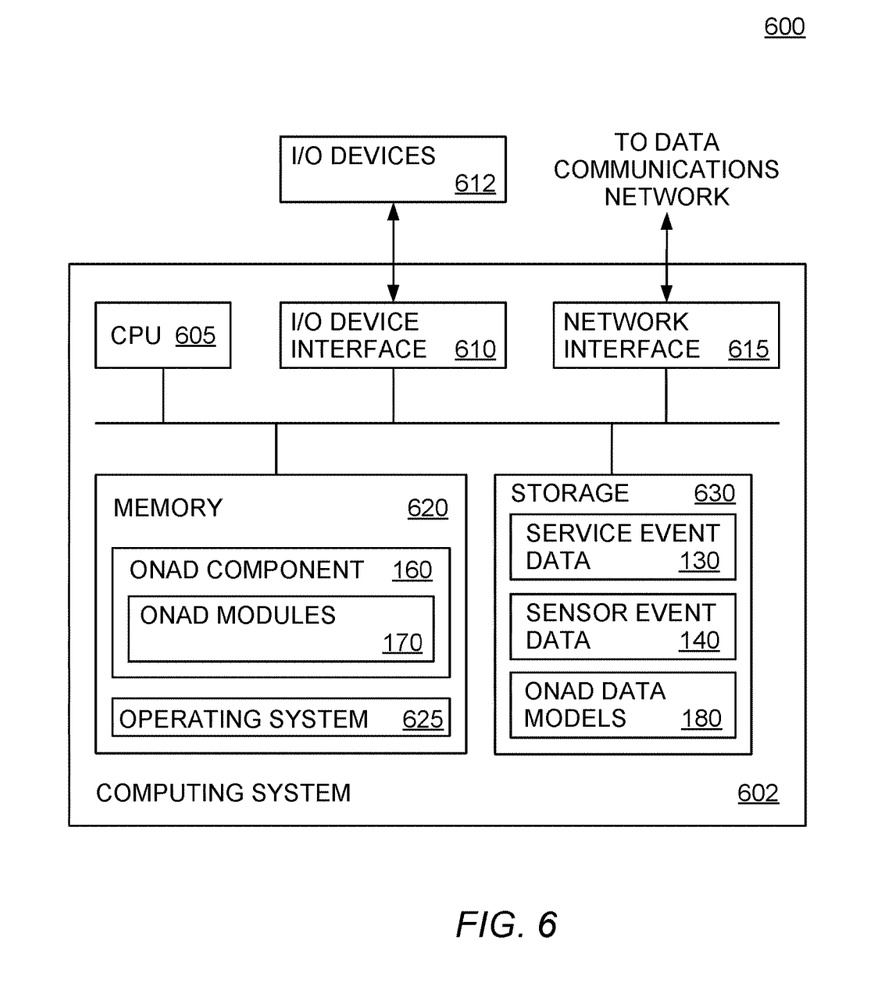
FIG. 6 is a block diagram illustrating a computing system configured with an ONAD component, according to one embodiment described herein.

FIG. 6 is a block diagram illustrating a computing system configured with an ONAD component, according to one embodiment described herein. As shown the computing environment 600 includes, without limitation, a computing system 602 that includes a central processing unit (CPU) 605, an input/output (I/O) device interface 610, a network interface 615, a memory 620, and storage 630, each connected to a bus. The I/O device interface 610 connects I/O devices 612 (e.g., keyboard, mouse, and display devices) to the computing system 602.

Generally, the CPU 605 retrieves and executes programming instructions stored in the memory 820 as well as stores and retrieves application data residing in the memory 820. The bus is used to transmit programming instructions and application data between CPU 805, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, the memory 620 includes an ONAD component 160 and an operating system 625. The ONAD component 160 contains ONAD modules 170. The storage 630 includes service event data 130, sensor event data 140 and ONAD data models 180. The ONAD component 160 can retrieve the sensor event data that is collected from a plurality of sensor devices onboard an aircraft during a flight. Additionally, the ONAD component 160 can retrieve a plurality of feature definitions, each specifying a respective one or more of the plurality of sensor devices and a respective algorithm for deriving data values from sensor data collected from the one or more sensor devices. The ONAD component 160 can determine whether anomalous activity occurred during the flight using an ONAD data model 180. Generally, the ONAD data model 180 can represent, for a first one of the plurality of feature definitions, a pattern of normal feature values for the feature definition. The ONAD component 160 can determine whether the anomalous activity occurred, for example, by comparing feature values calculated from the collected sensor event data 140 with the pattern of normal feature values for each of the plurality of feature definitions. The ONAD component 160 can generate a report specifying a measure of the anomalous activity for the flight. Doing so enables engineers to identify which flights demonstrated significant levels of anomalous activity, which can enabling them to prioritize the maintenance and inspection of the vehicles involved in these flights.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
   collecting sensor data from a plurality of sensor devices onboard an aircraft during a flight, wherein the collected sensor data from the plurality of sensor devices onboard the aircraft comprises any combination of measurements including pressure, temperature, flight parameters, aircraft parameters, and environmental measurements during different phases of the flight;
   retrieving a plurality of feature definitions, wherein a first one of the plurality of feature definitions specifies one or more of the plurality of sensor devices and an algorithm for deriving data values from sensor data collected from the one or more sensor devices;
   determining whether anomalous activity occurred during the flight using an anomaly detection model, wherein the anomaly detection model describes a pattern of normal feature values for at least the first feature definition, wherein the determining further comprises comparing feature values calculated from the collected sensor data with the pattern of normal feature values for the first feature definitions,
     wherein an anomaly is detected comprising at least one of (i) a point anomaly where a first data instance of a plurality of data instances is anomalous relative to other data instances in the plurality of data instances, (ii) a contextual anomaly where a second one of the plurality of data instances is anomalous relative to a specific context, and (iii) a collective anomaly where two or more data instances within the plurality of data instances are anomalous relative to a remainder of the plurality of data instances, and
     wherein two or more of the plurality of data instances are anomalous relative to a remainder of the plurality of data instances, even though each of the two or more data instances is not anomalous in and of itself; and
   generating a report specifying a measure of the anomalous activity for the flight.

2. The method of claim 1, wherein the anomaly detection model comprises a plurality of online networked anomaly detection (ONAD) modules, and the method further comprising:
   training the anomaly detection model, comprising:
     collecting sensor data from the plurality of sensor devices onboard the aircraft during a plurality of previous flights; and
     for each of the plurality of previous flights, and for each of the plurality of ONAD modules, updating a respective module memory array with a respective learned test reference (LTR) point for the previous flight.

3. The method of claim 2, wherein each LTR point comprises one or more statistical measures, correlation coefficients or other values of a feature measured against itself or any other feature or a plurality of other features, and wherein training the anomaly detection model further comprises:
   determining a convergence bound value;
   calculating a convergence value for each LTR point across the plurality of previous flights; and
   upon determining that a calculated convergence values for a first one of the plurality of previous flights exceeds the convergence bound value, determining that the training is complete.

4. The method of claim 3, wherein the convergence values are calculated according to the following equation $$CV_i^m = \frac{\left| \frac{\sum_{j=1}^{i} F_j^m}{i} - \frac{\sum_{j=1}^{i-1} F_j^m}{i-1} \right|}{\max(F_1^m, \ldots, F_i^m) - \min(F_1^m, \ldots, F_i^m)},$$

where $F_i^m$ represents the LTR point for a specified flight i and that includes learned features for ONAD module m.

5. The method of claim 1, wherein a first one of the plurality of feature definitions comprises a temporal representation of a measure of a differential magnitude over a window of time between values from one of the plurality of sensor devices, and wherein determining whether the anomalous activity occurred during the flight using the anomaly detection model, further comprises:
   calculating the feature values, based on the collected sensor data and the plurality of feature definitions.

6. The method of claim 1, wherein comparing the feature values calculated from the collected sensor data with the pattern of normal feature values for the first feature definition is further based on a respective time value during the flight at which the collected sensor data was collected by the respective one or more sensor devices, and wherein the time is expressed as at least one of (i) a measure of time elapsed since a beginning of the flight, (ii) a measure of time during one of a plurality of phases during the flight, (iii) a measure of time remaining in the flight, (iv) a percentage amount of time elapsed since a beginning of the flight and (v) a percentage amount of time remaining in the flight.

7. The method of claim 1, wherein comparing the feature values calculated from the collected sensor data with the pattern of normal feature values for the first feature definition further comprises:
   calculating the feature values based on one or more windows of sensor data collected by the respective one or more sensor devices during the flight.

8. The method of claim 1, wherein determining whether anomalous activity occurred during the flight further comprises:
calculating an anomaly score for the flight, wherein the anomaly score characterizes the anomalous activity that occurred during the flight with respect to both a duration of the anomalous activity and a magnitude of the anomalous activity.

9. The method of claim 8, wherein $a_i^m$ represents a number of anomalies detected by module m during the flight i, wherein $T_i^m$ represents a number of samples provided to module m during the flight i, wherein $$p_i^m = \frac{a_i^m}{T_i^m}$$

represents a percentage of the flight that module m considered anomalous, wherein $p_\theta^m$ represents a threshold percentage of anomalous that, if exceeded, indicates that the flight is considered anomalous.

10. The method of claim 9, wherein a weighting value $w_i^m$ used to scale an output of the anomaly score based on a convergence value $CV_i^m$, wherein $$w_i^m = \begin{cases} \frac{1 - CV_i^m}{1 - p_\theta^m}, & \text{where } \exists\, j \le i \text{ such that } CV_j^m > CB^m \\ 1, & \text{otherwise} \end{cases}.$$

11. The method of claim 10, wherein the calculated anomaly score for the flight comprises a duration anomaly score $D_i^m$, wherein the duration anomaly score is calculated as $$D_i^m = w_i^m \cdot \frac{p_i^m}{p_\theta^m}.$$

12. The method of claim 11, further comprising determining that the flight is an anomalous flight, responsive to determining that the duration anomaly score is greater than or equal to 1.

13. The method of claim 12, wherein determining whether anomalous activity occurred during the flight using an anomaly detection model further comprises:
calculating a single flight magnitude anomaly score $M_i^m$, wherein the single flight magnitude anomaly score is calculated as $$M_i^m = w_i^m \cdot \left(\frac{1}{\sigma_r}\right) \cdot \left(\frac{1}{a_i^m}\right) \sum_{j=1}^{a_i^m} \frac{(F_j - \overline{F_m})}{\sigma_m},$$

where $a_i^m$ represents the number of anomalies for flight i and module m, $F_j$ represents an observed anomalous point, $\overline{F_m}$ represents a learned mean for the module m, $\sigma_m$ represents a standard deviation for the module m, and $\sigma_r$ represents an outlier threshold value used to scale the single flight magnitude anomaly score.

14. The method of claim 13, wherein determining whether anomalous activity occurred during the flight using an anomaly detection model further comprises:
calculating an aggregate anomaly score for the flight as $A_i^m = D_i^m \cdot M_i^m$.

15. The method of claim 1, further comprising:
outputting for display at least a portion of the report specifying the measure of the anomalous activity for the flight; and
performing one or more maintenance activities on the aircraft, as a result of the report, so as to prevent anomalous activity from occurring during one or more subsequent flights of the aircraft.

16. The method of claim 1, further comprising:
receiving, over a data communications network, additional sensor data collected from a second plurality of sensor devices onboard at least one additional aircraft during a plurality of previous flights; and
training the anomaly detection model, wherein the anomaly detection model comprises a plurality of online networked anomaly detection (ONAD) modules, and comprising, for each of the plurality of previous flights, updating a respective module memory array with a respective learned test reference (LTR) point for the previous flight.

17. A non-transitory computer-readable medium containing computer program code that, when executed, performs an operation comprising:
collecting sensor data from a plurality of sensor devices onboard an aircraft during a flight;
retrieving a plurality of feature definitions, wherein a first one of the plurality of feature definitions specifies one or more of the plurality of sensor devices and an algorithm for deriving data values from sensor data collected from the one or more sensor devices;
determining whether anomalous activity occurred during the flight using an anomaly detection model, wherein the anomaly detection model describes a pattern of normal feature values for at least the first feature definition, wherein the determining further comprises:
comparing feature values calculated from the collected sensor data with the pattern of normal feature values for the first feature definitions, and
calculating an anomaly score for the flight, wherein the anomaly score characterizes the anomalous activity that occurred during the flight with respect to both a duration of the anomalous activity and a magnitude of the anomalous activity,
wherein $a_i^m$ represents a number of anomalies detected by module m during the flight i, wherein $T_i^m$ represents a number of samples provided to module m during the flight i, wherein $$p_i^m = \frac{a_i^m}{T_i^m}$$

represents a percentage of the flight that module m considered anomalous, and wherein $p_\theta^m$ represents a threshold percentage of anomalies that, if exceeded, indicates that the flight is considered anomalous; and
generating a report specifying a measure of the anomalous activity for the flight.

18. A system, comprising:
one or more computer processors; and
a memory containing computer program code that, when executed by operation of the one or more computer processors, performs an operation comprising:

collecting sensor data from a plurality of sensor devices onboard an aircraft during a flight, wherein the collected sensor data from the plurality of sensor devices onboard the aircraft comprises any combination of measurements including pressure, temperature, flight parameters, aircraft parameters, and environmental measurements during different phases of the flight;

retrieving a plurality of feature definitions, wherein a first one of the plurality of feature definitions specifies one or more of the plurality of sensor devices and an algorithm for deriving data values from sensor data collected from the one or more sensor devices;

determining whether anomalous activity occurred during the flight using an anomaly detection model, wherein the anomaly detection model describes a pattern of normal feature values for at least the first feature definition, wherein the determining further comprises comparing feature values calculated from the collected sensor data with the pattern of normal feature values for the first feature definitions, wherein an anomaly is detected comprising at least one of (i) a point anomaly where a first data instance of a plurality of data instances is anomalous relative to other data instances in the plurality of data instances, (ii) a contextual anomaly where a second one of the plurality of data instances is anomalous relative to a specific context, and (iii) a collective anomaly where two or more data instances within the plurality of data instances are anomalous relative to a remainder of the plurality of data instances, and wherein two or more of the plurality of data instances are anomalous relative to a remainder of the plurality of data instances, even though each of the two or more data instances is not anomalous in and of itself; and generating a report specifying a measure of the anomalous activity for the flight.

\* \* \* \* \*